(12) United States Patent
Gautier et al.

(10) Patent No.: US 12,392,679 B2
(45) Date of Patent: Aug. 19, 2025

(54) METHOD FOR CODING COMMUNICATION CONDUCTORS OF A LINEAR SENSOR BELONGING TO A SYSTEM

(71) Applicant: TTK, Paris (FR)

(72) Inventors: Olivier Gautier, Paris (FR); Olivier Gillot, Paris (FR)

(73) Assignee: TTK, Paris (FR)

( * ) Notice: Subject to any disclaimer, the term of this patent is extended or adjusted under 35 U.S.C. 154(b) by 0 days.

(21) Appl. No.: 18/868,425

(22) PCT Filed: Jun. 13, 2023

(86) PCT No.: PCT/EP2023/065852
§ 371 (c)(1),
(2) Date: Nov. 22, 2024

(87) PCT Pub. No.: WO2023/242217
PCT Pub. Date: Dec. 21, 2023

(65) Prior Publication Data
US 2025/0110009 A1 Apr. 3, 2025

(30) Foreign Application Priority Data
Jun. 16, 2022 (FR) ........................ 2205911

(51) Int. Cl.
*G01M 3/16* (2006.01)
*H04B 3/50* (2006.01)

(52) U.S. Cl.
CPC .............. *G01M 3/165* (2013.01); *H04B 3/50* (2013.01)

(58) Field of Classification Search
CPC ............ G01M 3/02; G01M 3/04; G01M 3/16; G01M 3/165; H04B 3/50; G01R 27/02; G01R 27/22
See application file for complete search history.

(56) References Cited

U.S. PATENT DOCUMENTS

| | | | | |
|---|---|---|---|---|
| 6,369,718 B1 * | 4/2002 | Mathieu | ................ | E21B 47/12 333/100 |
| 2005/0174246 A1 * | 8/2005 | Picco | ..................... | G01M 3/18 73/40 |

(Continued)

FOREIGN PATENT DOCUMENTS

| EP | 2330397 A1 | 6/2011 |
|---|---|---|
| EP | 3066443 A1 | 9/2016 |

(Continued)

OTHER PUBLICATIONS

International Search Report and Written Opinion received for PCT/EP2023/065852, mailed Aug. 7, 2023.

(Continued)

*Primary Examiner* — Huy Q Phan
*Assistant Examiner* — David B Frederiksen
(74) *Attorney, Agent, or Firm* — Greer, Burns & Crain, Ltd

(57) ABSTRACT

Disclosed is a method for coding communication conductors of a linear sensor belonging to a system, wherein the method includes the following steps: —coding at least two information signals simultaneously as follows: at least one information signal being coded by the central unit by increasing voltage T on the first communication conductor, at least one information signal being coded by the central unit by decreasing voltage T on the second communication conductor, —the central unit reading a voltage by measuring the voltage difference between the two communication conductors.

13 Claims, 2 Drawing Sheets

(56) References Cited

U.S. PATENT DOCUMENTS

| | | | | |
|---|---|---|---|---|
| 2005/0252294 A1* | 11/2005 | Ariav | ................ | G01N 29/4436 |
| | | | | 73/597 |
| 2007/0157706 A1* | 7/2007 | Yanagi | ................ | G01M 3/3245 |
| | | | | 702/51 |
| 2007/0285057 A1* | 12/2007 | Yano | ..................... | B60L 3/12 |
| | | | | 320/116 |
| 2017/0363501 A1* | 12/2017 | Franz | .................... | G01M 3/165 |

FOREIGN PATENT DOCUMENTS

| | | | |
|---|---|---|---|
| FR | 2773613 A1 | 7/1999 | |
| FR | 2998753 A1 | 5/2014 | |
| GB | 2337675 A | 11/1999 | |

OTHER PUBLICATIONS

International Preliminary Report on Patentability and amended claims received for PCT/EP2023/065852, mailed Jan. 31, 2024. [English Translation and Translator Declaration attached].

Corrigan, S., "Industrial Interface," Introduction to the Controller Area Network (CAN), Texas Instruments, Application Report, 2002 (revised May 2016), 17 pages.

Wang, K., et al., "Transceiver Interface," RS-485 Basics Series, Technical White Paper, Texas Instruments, Feb. 2021, 17 pages.

\* cited by examiner

[Fig. 1]
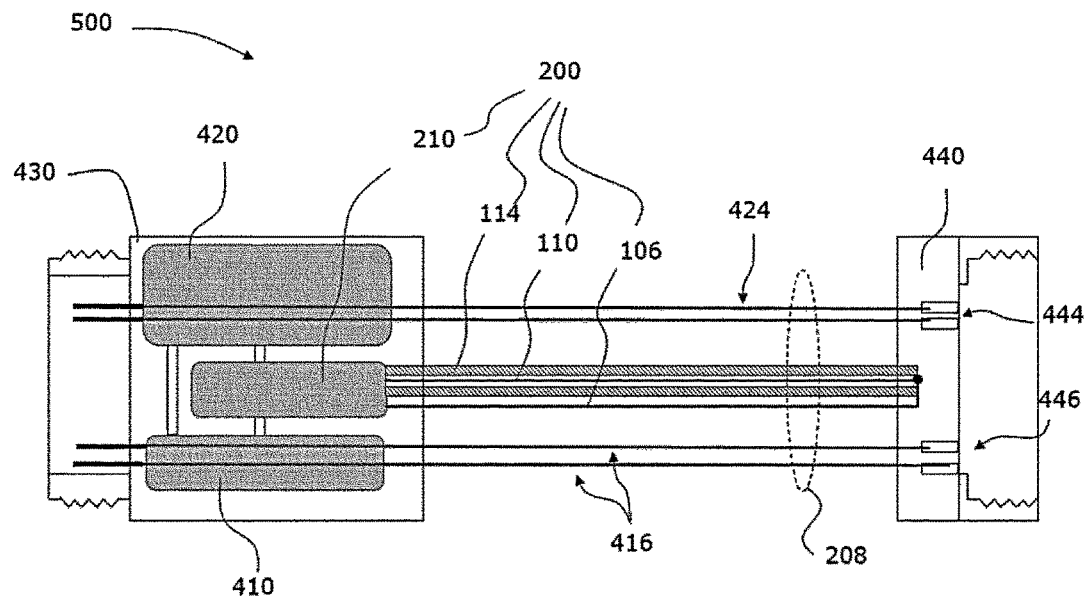
[Fig. 2]
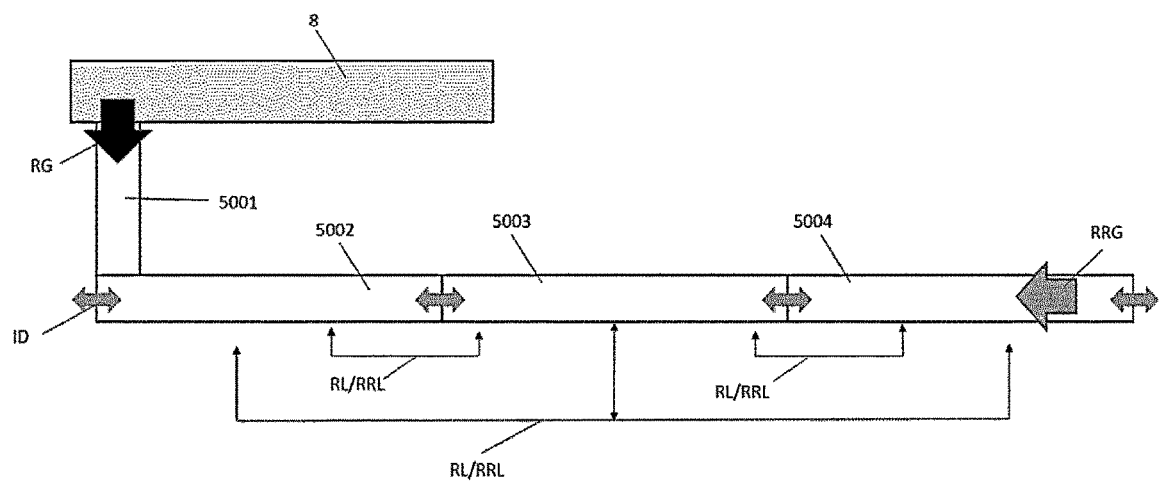

[Fig. 3]
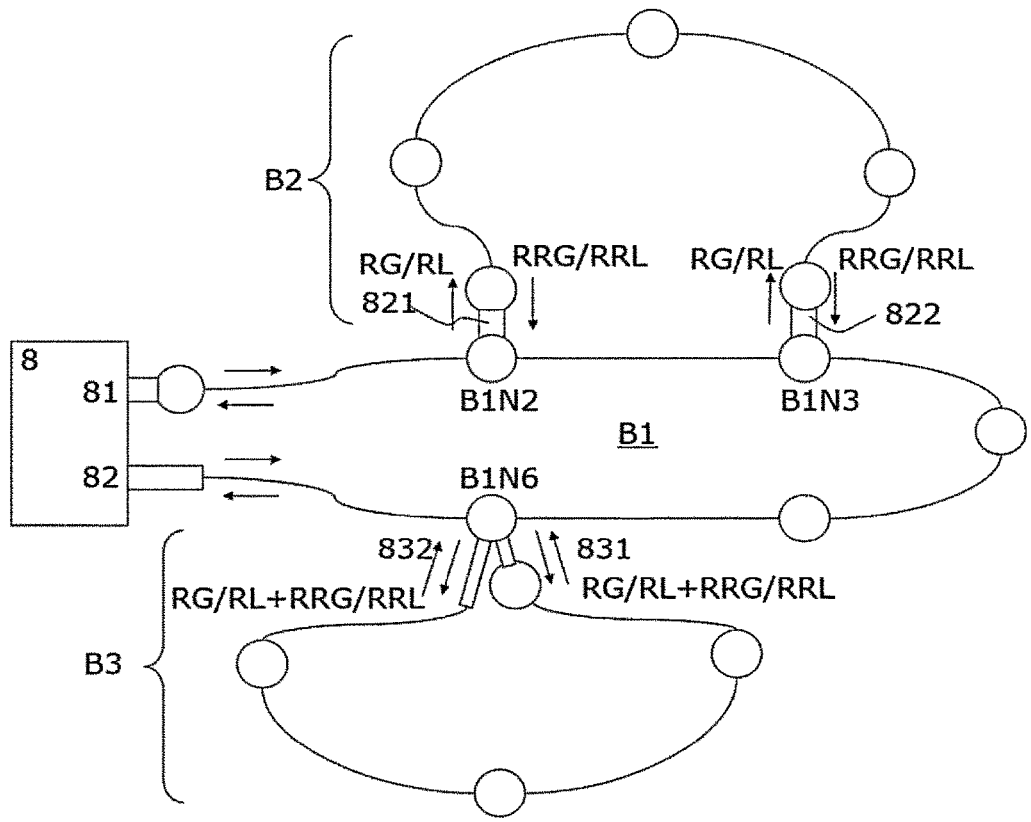
[Fig. 4]
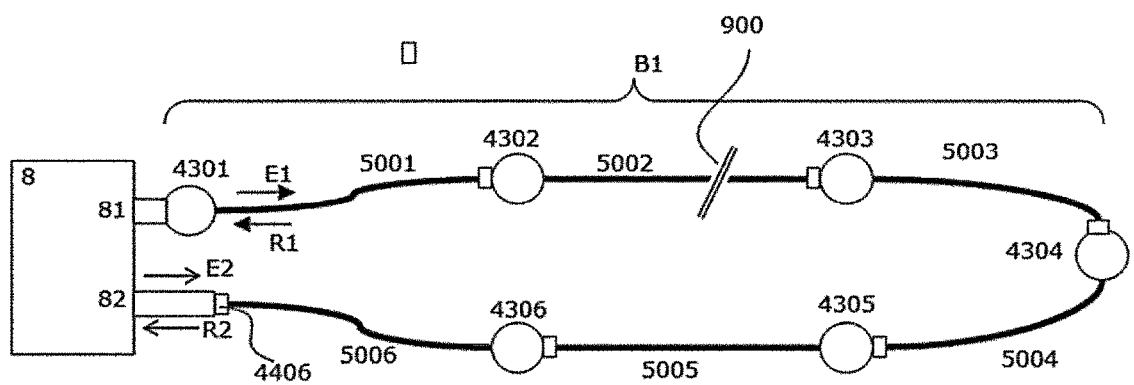

METHOD FOR CODING COMMUNICATION CONDUCTORS OF A LINEAR SENSOR BELONGING TO A SYSTEM

BACKGROUND

The present invention relates to a method for coding communication conductors of a linear sensor belonging to a system. It also relates to a system for carrying out said method.

To detect liquid leaks over long distances, such as oil or water pipelines, or over large surfaces, such as industrial premises or computer rooms, it is known to install linear sensors connected together in series to form a sensing line.

In such a sensing line, each sensor comprises an elongated portion which includes, along all or part of its length, means sensitive to the liquid(s) to be sensed. The sensors also comprise a communication bus in their elongated part, which are connected together to form a query bus running the entire length of the sensing line. The end of the sensing line is connected to a central unit.

Such a sensing line, in a hydrocarbon-sensitive version, is disclosed in document EP3066443. Other sensing modes are known, for example with sensitivity to conductive liquids such as water, as disclosed in documents FR2773613 and EP09306176.

It is still desirable to improve these types of detectors and installations, particularly in terms of reliability, cost and performance, to enable them to cover larger, more varied areas, in a way that is more flexible to install, maintain, manage or replace.

One aim of the invention is to compensate in whole or in part for the disadvantages of the state of the art, in particular by improving their performance on these different points or the compromises between these different performances.

SUMMARY

This objective is achieved with a method for coding communication conductors of a linear sensor belonging to a system, the system comprising a central unit and a plurality of linear sensors each comprising a first end and a second end and which are connected to one another in series to form a differential bus, which is functionally connected to said central unit by at least one end of said differential bus, each linear sensor comprising at least:
 a first connector at a first end of said linear sensor, the first connector comprising a management module connected to a communication module,
 a second connector at a second end of said linear sensor,
 two communication conductors, the two communication conductors being connected to the first connector at a first end of said two communication conductors, and to the second connector at a second end of said two communication conductors.

According to the invention, the method comprises the following steps:
 coding at least two information signals simultaneously as follows:
 at least one information signal being coded by the central unit by increasing voltage T on the first communication conductor,
 at least one information signal being coded by the central unit by decreasing voltage T on the second communication conductor,
 the central unit reading a voltage by measuring the voltage difference between the two communication conductors.

In the event of disturbances caused by the system environment, such as generators or voltage variations, the disturbances act on both communication conductors in the same direction and in the same way.

When the central unit reads the voltage, the difference between the two communication conductors remains unchanged, and as a result, so does the reading.

"Simultaneous" means that the information signals are coded at the same time on each of their respective communication conductors.

The system can also comprise at least one accessory corresponding to a branch and/or a terminator and/or a neutral cable, each accessory comprising at least one output.

"Branch" refers to an element that allows the addition of at least one second element, typically a linear sensor.

"Terminator" refers to an end-of-line element indicating the end of a series wiring of linear sensors, in order to distinguish a linear sensor break or discontinuity.

"Neutral cable" refers to a cable that connects two remote sensors/branches without adding functionality.

"Element" refers to either a branch, a terminator or a neutral cable. Accessories are not limited to the above list.

There are several types of branch, such as a straight branch, a loop branch and/or a length branch.

"Straight branch" refers to a branch that allows the addition of branched linear sensors and accessories in series without return.

"Loop branch" refers to a branch that allows the addition of branched linear sensors and/or accessories to the loop (wiring with return to the branch).

"Length branch" refers to a branch that allows the addition of a branched linear sensor of any length in series without return. This accessory makes it possible to integrate linear sensors with undefined feed lengths into the system. The branch then measures the length of the linear sensor. The branch sends the information back to the central unit.

These accessories can be used to create unique systems or networks adapted to the sensing zone. The network can then be modulated according to need.

The information signal can be sent by the central unit in the form of information bits.

The central unit can be arranged to send at least one general request to the differential bus and to receive at least one response to said general request from the plurality of linear sensors and the at least one accessory.

The method may also comprise the following steps:
 communicating the at least one general request sent by the central unit through the plurality of linear sensors and/or the at least one accessory via the two communication conductors,
 communicating the at least one response to the general request sent by said plurality of linear sensors and/or by the at least one accessory via the two communication conductors.

In fact, a general request is transmitted via the differential bus on the two communication conductors of each linear sensor. The general request is sent to both communication conductors simultaneously. Responses to the general request are received via each corresponding communication conductor.

Each linear sensor and/or accessory can be arranged to send at least one local request and to receive at least one response to the at least one local request from each linear sensor and/or accessory, the method further comprising the following steps:

communicating, via the two communication conductors, the at least one local request to at least one linear sensor identified by said linear sensor and/or by the at least one accessory, the at least one linear sensor being considered as identified if one of its connectors is connected to one of the connectors of said linear sensor and/or to the at least one output of the at least one accessory, communicating, via the two communication conductors, at least one response to at least one local request from the linear sensor identified by said linear sensor and/or accessory.

A local request is transmitted on both communication conductors of each linear sensor. The local request is sent to both communication conductors simultaneously. Responses to the local request are received via each corresponding communication conductor.

The advantage here is that communication between the differential bus and the central unit is two-way on the two communication conductors of each linear sensor. "Two-way" means that information signals such as query signals and response signals are transmitted on the same communication conductors for both ends of said differential bus. The central unit sends query signals to both ends of the differential bus, one end at a time. The central unit waits to receive response signals from the first end of the differential bus before sending query signals to the second end of the differential bus. The query and response signals are transmitted via the communication conductors of each linear sensor making up the differential bus. In an embodiment where the differential bus is connected to the central unit by only one of its ends, communication can be initiated by both ends, either on the central unit side or on the network element side.

The system may comprise several central units, said central units being connected to one another via a wireless network (e.g. WiFi) or via a wired connection (e.g. Ethernet or Modbus).

Each linear sensor and/or accessory can be characterized by a unique identifier.

The at least one response to the at least one general request sent by the linear sensor may comprise the unique identifier of the at least one linear sensor identified by said linear sensor as well as the unique identifier of said linear sensor, and/or the at least one response to the at least one general request sent by the accessory comprises the unique identifier of the at least one linear sensor identified by said accessory as well as the unique identifier of said accessory.

The at least one response to the local request may consist of the unique identifier of the at least one linear sensor identified by said linear sensor and/or the accessory.

A further advantage of the method according to the invention is that the communication conductors enable the central unit to define how many linear sensors and accessories are in the network, and where each linear sensor and accessory is located in the network. They also enable the central unit to reconstruct the logical topology of the entire linear sensor network based on the unique identifiers received.

The at least one response to the local request and the at least one response to the general request may also comprise data specific to each linear sensor and/or accessory.

Specific data can be sent to the central unit via the communication conductors for each linear sensor and/or accessory. The specific data is advantageously sent to the central unit as raw data. This makes it possible to process each of the raw values received by the central unit according to the needs or characteristics of the linear sensor or accessory concerned, without the need for the user to program these choices in advance in the central unit. Specific data are transmitted via the communication conductors of each linear sensor making up the differential bus.

Owing to the specific data, the central unit can advantageously manage the organization of the network and, for example, define which type of linear sensor is involved, or define their history. It can also define which accessory is involved. In addition, specific data is used to keep the network running smoothly.

Communication on communication conductors can occur in both directions.

The plurality of linear sensors on the differential bus may correspond to a plurality of linear sensors sensitive to conductive liquids and/or sensitive to non-conductive liquids and/or sensitive to hydrocarbons.

When sensing a conductive liquid, such as water/basic acid, the resistivity of the sensing member decreases on contact with said liquid. When sensing a non-conductive liquid such as a hydrocarbon or solvent, for example, the resistivity of the sensing member increases on contact with said liquid.

According to yet another aspect of the invention, a system is proposed for implementing the method according to the invention, the system comprising a central unit and a plurality of linear sensors each comprising a first end and a second end and which are connected together to form a sensing line, which is connected to said central unit by at least one end of said sensing line.

The system can also comprises at least one accessory.

According to another aspect of the invention, also proposed is a computer program comprising instructions which, when the program is executed by a computer, cause the latter to implement the steps of the method according to the invention.

BRIEF DESCRIPTION OF THE DRAWINGS

Other benefits and features shall become evident upon examining the detailed description of entirely non-limiting embodiments and implementations, and from the following enclosed drawings:

FIG. 1 shows a linear sensor,

FIG. 2 shows an example of an embodiment according to the invention,

FIG. 3 describes another example of an embodiment according to the invention,

FIG. 4 describes an example of an embodiment according to the invention.

DETAILED DESCRIPTION

These embodiments are in no way limiting, and in particular, it is possible to consider variants of the invention that comprise only a selection of the features disclosed hereinafter in isolation from the other features disclosed (even if that selection is isolated within a phrase comprising other features), if this selection of features is sufficient to confer a technical benefit or to differentiate the invention with respect to the prior state of the art. This selection comprises at least one preferably functional feature which lacks structural details, and/or only has a portion of the structural details if that portion is only sufficient to confer a technical benefit or to differentiate the invention with respect to the prior state of the art.

FIG. 1 shows an example of a linear sensor used in the context of the invention. However, other types of linear sensors connected in series can be used within the scope of the invention, with all types of sensing modes, and all types of communication and/or power bus. Different linear sensors can also be used together within the scope of the invention, provided that their communication buses are compatible with one another and with the central unit.

In this example, each linear sensor 500 comprises a detector 200. This detector 200 comprises a management module 210, which is connected to the proximal end of a sensing member 208 elongated along the entire length of the linear sensor 500. This sensing member 208 forms a bundle comprising two metallic conductors 106 and 110 and two sensing conductors 114, which are electrically connected in pairs. The management module 210 measures the electrical properties of the sensing conductors 114 using one of the metallic conductors 106 and 110, known as the measurement return lead. When sensing a conductive liquid, such as water/basic acid, the resistivity of the sensing member decreases on contact with said liquid. When sensing a non-conductive liquid such as a hydrocarbon or solvent, for example, the resistivity of the sensing member increases on contact with said liquid.

In addition to the sensing element 200, the linear sensor 500 comprises a communication element which includes two communication conductors 416 and two power conductors 424 running along the entire length of the linear sensor 500. The two communication conductors use two-way communication. At the proximal end of the linear sensor 500, a connector 430 encloses the management module 210. The connector 430 also comprises a communication module 410 and a power module 420, which are connected to the communication 416 and power 424 conductors, forming a powered differential communication bus therewith.

Each linear sensor 500 carries a connector 440 at its distal end. The connector 440 comprises connection ports 444 and 446, enabling the distal end of its power 424 and communication 416 conductors, respectively, to be connected to the proximal end of another linear sensor of the same type.

The positions of the connectors 430 and 440 are not limiting. In some embodiments, the connector 440 is positioned on the proximal end of the linear sensor 500 and the connector 430 on the distal end of the linear sensor 500, for example.

At least two information signals are coded by the central unit 8 simultaneously on the two communication conductors as follows:
- at least one information signal is coded by the central unit by increasing voltage T on the first communication conductor,
- at least one information signal being coded by the central unit 8 by decreasing voltage T on the second communication conductor.

For example, one of the information signals is plus-five volt coded on a first information conductor, while another information signal is minus-five volt coded on a second information conductor, simultaneously. The voltage values given here are in no way restrictive. They are given by way of example. The various information signals are transmitted through all the linear sensors making up the network via the communication conductors of each linear sensor. A voltage reading is then taken by the central unit by measuring the voltage difference between the two communication conductors.

Information signals are transmitted in the form of information bits.

With reference to FIG. 2, we will now describe an example of an embodiment.

The system or network shown consists of a central unit 8 and four linear sensors 5001 to 5004 connected in series and connected to the central unit 8 by one end of the linear sensor 5001. The number of linear sensors is given by way of example and as a result is not limiting. The series of linear sensors forms a closed, non-looping sensing line. It is closed with a terminator. Each linear sensor comprises two communication conductors 416. The two communication conductors of each linear sensor are arranged to transmit different requests sent by the central unit 8. The two communication conductors are also arranged to transmit the responses to the various requests received to the central unit 8.

When the system starts up, each network element, that is, the linear sensors and the terminator in this example, will automatically send a local request RL to the upstream and/or downstream elements. Local requests RL are sent autonomously at startup. "Autonomous" means that local requests are sent without a general request from the control unit beforehand. The various elements can send local requests one after the other, or by network section, or all at once, for example.

First and in the example shown, the linear sensor 5001 identifies the linear sensor 5002 downstream, the linear sensor 5002 identifies the linear sensor 5001 upstream and the linear sensor 5003 downstream, the linear sensor 5003 identifies the linear sensor 5002 upstream and the linear sensor 5004 downstream, and the linear sensor 5004 identifies the linear sensor 5003 upstream (reference ID in FIG. 2).

In a second step, each linear sensor 5001 to 5004 sends a local request RL to the linear sensors they have each identified via the two communication conductors of each linear sensor. The local request is transmitted simultaneously on each communication conductor. In the example shown in FIG. 2, the linear sensor 5001 sends a local request RL to the linear sensor 5002, the linear sensor 5002 sends a local request RL to the linear sensors 5001 and 5003, the linear sensor 5003 sends a local request RL to the linear sensors 5002 and 5004, and finally the linear sensor 5004 sends a local request RL to the linear sensor 5003.

The local requests RL are therefore sent by the two communication modules of each linear sensor 5001 to 5004 in the form of a query signal. The communication conductors used to send local requests are the same as those used to send general requests RG. The local requests RL received are processed by the management module 210 of each linear sensor 5001 to 5004. All the linear sensors 5001 to 5004 process the local request RL they have received and respond to it (reference RRL in FIG. 2) by sending responses via the two communication conductors. Each communication conductor sends the expected responses RLR following the local request RL sent. The various elements can respond to the local requests one after the other, or by network section, or all at once, for example.

Each detector 200 internal to each linear sensor comprises a unique identifier which enables it to be identified. The unique identifier corresponds to the serial number of the detector 200 of each linear sensor, for example. When a linear sensor responds to a local request RRL, it communicates its unique identifier to the linear sensor that sent the local request RL. For example, the linear sensor 5001 sends its unique identifier in response to the local request RRL of the linear sensor 5002, the linear sensor 5002 sends its unique identifier in response to the linear sensors 5001 and 5003, the linear sensor 5003 sends its unique identifier in response to the linear sensors 5002 and 5004, and finally the sensor 5004 sends its unique identifier in response to the linear sensor 5003. The unique identifiers are sent via the two communication modules of each linear sensor 5001 to 5004.

In a preferred embodiment, the central unit 8 sends a general request RG to all the linear sensors 5001 to 5004 and to the terminator, in order to obtain all the unique identifiers of the elements that make up the network, as well as the unique identifiers identified by the various elements of the network, that is, the elements that are upstream/downstream of the elements and/or that are connected to the various elements. This general request RG will enable the central unit to reconstruct the architecture of the network or system.

The general request RG is transmitted through the network via the two communication conductors of each linear sensor in the center-to-terminator direction. In other words, the general request RG is sent on both communication conductors simultaneously.

The general request RG is received by each communication module of each linear sensor 5001 to 5004. The general request RG is processed by the management module 210 of each linear sensor. The general request RG is transmitted as a query signal by the central unit 8 to the individual linear sensors via the communication conductors of each linear sensor. The number of general requests is not limited. The first communication conductor operates identically to the second communication conductor and vice versa. The general request RG has been sent on each of the two communication conductors, and as a result each communication conductor allows responses to the general request RRG to be sent back to the central unit.

Initially, the central unit 8 sends a general request RG to all the linear sensors 5001 to 5004 and to the terminator. In response to the general request RG sent by the central unit 8, each network element sends its unique identifier and the unique identifiers of the elements upstream/downstream of it, obtained from the various local requests RL sent during system startup.

As a result, each linear sensor transmits its unique identifier (response to the first general request RRG) and the unique identifiers of the linear sensors it has identified (response to the second general request RRG) to the central unit 8. For example, in this case, in response to the general request RRG, the linear sensor 5001 sends its unique identifier and that of the linear sensor 5002 to the central unit, the linear sensor 5002 sends its unique identifier and the unique identifiers of the linear sensors 5001 and 5003 to the central unit 8, the linear sensor 5003 sends its unique identifier and the unique identifiers of the linear sensors 5002 and 5004 to the central unit, and lastly the linear sensor 5004 sends its unique identifier and that of the linear sensor 5003 to the central unit 8. Responses to the general request RRG are transmitted as a response signal to the central unit 8.

In this preferred embodiment, the general request RG sent also enables specific data specific to network elements to be fed back to the central unit 8. In this case, each network element sends a new local request to upstream and/or downstream elements. The response to the local request RRL from each linear sensor or accessory such as the terminator then comprises the specific data requested by the general request RG, which are specific to the various network elements. The responses to the various local queries may comprise one or more specific data items. Specific data for example include:

a commissioning date for the linear sensor,
the type of linear sensor,
a linear sensor length,
an internal loop resistor in the linear sensor,
a pollution level,
an alarm condition,
a power level.

Specific data are not limited to this list. In other embodiments, specific data may be, for example, historical or sensitivity data.

Each linear sensor comprises a commissioning date. This specific datum is stored in the management module 210 of said linear sensor, for example. The same applies to the type of linear sensor and its length. This specific data is therefore transmitted to the central unit 8 when responding to a local request RRL, or when responding to a general request RRG, via the two communication conductors of each linear sensor.

The term "internal loop in the linear sensor" in the expression "internal loop resistor in the linear sensor" refers to a loop formed by one of the metallic conductors and a measurement return lead in a linear sensor (references 106 and 110 in FIG. 1). The resistance of an internal loop therefore corresponds to its current state. In the event that, for example, the metallic conductor or return lead is cut, damaged, or for any other reason the internal loop is no longer functional, a linear sensor alarm status corresponding to a discontinuity alarm is sent to the central unit 8 to warn the user.

The sensing conductors 114 (FIG. 2) comprise a resistor (not shown in the figures) to determine whether a break in the sensing member 208 has occurred. The term "pollution level" refers to the pollution level of said resistor of the sensing conductors 114. In fact, when using a linear sensor, dust can be deposited on the resistor, for example, or the resistor can degrade as a result of the environmental conditions in which it finds itself. In this case, a linear sensor alert corresponding to a cleaning alert is sent to the central unit 8 to warn the user, for example.

An alarm status is sent if any of the conditions previously described occur via the communication conductors. The alarm status is also activated based on a network sensitivity level. Indeed, this sensitivity level is defined according to the specific pollution and/or resistance data sent to the central unit from the internal loops. To achieve this, a sensitivity threshold is defined in advance for each linear sensor or for the network as a whole, depending on requirements. For example, the sensitivity threshold is set between one and five if it is an individual sensitivity threshold, that is, specific to each linear sensor, or to zero if it is an overall network sensitivity threshold.

The power level of a linear sensor is defined by the power module 420. The two power conductors 424 are responsible for transmitting power through the network. However, the range of the power is limited to a certain distance from the linear sensors, that is, a certain cable length. As a result, the power level of each linear sensor is transmitted when a general request RG is sent by the central unit and/or when a local request RL is sent by one of the linear sensors.

If the central unit 8 identifies a linear sensor with a power level that is too low, that is, below a predetermined threshold, the management module 210 of the linear sensor in question sends an alert status to the central unit 8. The central unit 8 then sends a message to the user so that he can intervene on the network. For example, if the power of the network is equal to twelve volts, the predetermined threshold may be around ten volts-ten and a half volts. The central unit can also warn the user that there are too many elements on the loop. The user can then intervene and remove elements or add external power if possible.

In the event of a break or failure in one of the linear sensors, it goes into alarm status. The management module of said linear sensor in alarm status then transmits this specific data to the central unit in response to the general request RRG or to a local request RRL from a linear sensor.

When all the responses to the local requests RRL have been sent and processed by the linear sensors, each linear sensor 5001 to 5004 responds to the general request RRG sent by the central unit 8 (referenced RRG in FIG. 2) via the two communication conductors of each linear sensor in the terminator-to-central unit direction, the communication conductors being the same as those transmitting the query signals.

In the preferred embodiment presented here, a single general request RG is sent by the central unit 8 to receive the unique identifiers of each network element, as well as specific data enabling the central unit 8 to know, for example, the type of element forming the network, or the state it is in.

Communication via the communication conductors of each linear sensor enables the central unit 8, based on the specific data received and the unique identifiers of the network elements, to determine directly which linear sensor is in alarm status and where it is located in the network, for example.

The two communication conductors of each sensor then enable communication between the central unit and all the network elements, this communication being two-way (central unit terminator/terminator central unit) on the two communication conductors of each linear sensor. The dual direction of the communication conductors operates from each of its ends, that is, from end one to end two and vice versa and/or from end two to end one and vice versa.

In a second embodiment, the central unit 8 sends two separate general requests RG, one for the unique identifiers of each element and the other for the specific data for each element.

Initially, when the network is started up, the central unit 8 sends a first general request RG to all the linear sensors 5001 to 5004 in order to obtain all the unique identifiers included in each element making up the network, as well as the unique identifiers identified by the various elements of the network, that is, the elements upstream/downstream of the elements and/or connected to the various elements. Following this first general request RG, each network element, that is, the linear sensors and the terminator in this example, will send a local request RL to the upstream and/or downstream elements. In this embodiment, local requests are sent by network elements not autonomously, but on demand. On the same principle as in the preferred embodiment, all network elements respond to the various local requests RL sent. Once all the local requests RL have been processed, the network elements respond to the first general request RG in the same way as in the preferred embodiment.

Then, if required, the central unit sends a second general request RG to obtain the various specific data for each network element. The specific data are the same as those presented in the preferred embodiment. Sending the second request works on the same principle as sending a single general request RG as shown in the preferred embodiment.

The central unit 8 then receives all the responses to the general requests RRG (the first and the second), and processes them. The responses to general requests are therefore adapted to the type of general request sent.

FIG. 3 shows another example embodiment of the invention. In this example, the various requests correspond to query signals. The various responses to different requests correspond to response signals.

The network consists of a central unit 8 comprising two connectors 81 and 82 connected to a series of linear sensors forming the loop B1 via the connectors of the linear sensors located at the ends of said series. The loop B1 comprises branches B1N2, B1N3 and B1N6, which receive two series of linear sensors forming the secondary loops B2 and B3.

These branches B1N2, B1N3 and B1N6 are formed by a branch electronic module, which is arranged to receive in at least one of its outputs, the connector of one or more linear sensors, potentially of the same type but not necessarily.

In this example, each of these branches is located at one of the connectors of a linear sensor, for example in the casing containing the communication module 410 (see FIG. 1). The connector 4302 thus contains a branch B1N2, the connector 4303 contains a branch B1N3, and the connector 4306 contains a branch B1N6.

Within a linear sensor, each of the branches is functionally connected to the communication module 410 and as a result to the two communication conductors, which transmit to it the query signals E1, E2 it receives via the communication conductors, in addition to transmitting them to the adjacent linear sensor. The branch is arranged to transmit the query signal to a branched linear sensor via a junction box.

In this way, the differential bus (referred to as the rank-one loop or loop B1) carries a so-called simple branch B1N2, fitted with a junction box 821 to which one of the ends of a second differential bus (referred to as the rank-two loop or loop B2) is connected. The primary loop B1 also carries a second single branch B1N3, fitted with a second junction box 822 to which the second end of the secondary loop B2 is connected.

Each network branch and/or accessory sends a response signal comprising data specific to said branch and/or accessory at the same time as it transfers response signals from the second differential bus to the central unit.

Through this junction box 821, the branch B1N2 echoes, in the form of first query signals E21 in loop B2, the first query signals E1 received in the connector 4302 and sent by the query port 81 through the communication conductors of the loop B1. The branch B1N2 is also designed to receive, via its junction box 821, response signals R21 sent by the communication conductors of the loop B2 in response to the query signals E21, and to pass them on in the primary loop B1 in the form of response signals R1. The response signals R21 are transmitted to the query port 81 of the central unit that transmitted the query signals via the communication conductors of the loop B1. It is understood here that the communication conductors of the linear sensors operate in the same way as shown in FIG. 2.

Through this junction box 822, the branch B1N3 echoes, in the form of first query signals E22 in loop B2, the first query signals E2 received in the connector 4303 and sent by the query port 82 through the communication conductors of the loop B1. The branch B1N3 is also designed to receive, via its junction box 822, response signals R22 sent by the communication conductors of the loop B2 in response to the query signals E22, and to pass them on in the primary loop B1 in the form of response signals R2. The response signals R22 are transmitted to the query port 82 of the central unit that transmitted the query signals via the communication connectors of the loop B1.

This primary loop B1 also carries a third, so-called double, branch B1N6. The latter operates in the same way as the single branches, with the difference that it combines and manages both a first junction box 831 and a second junction box 832, to which the two ends of a second secondary loop B3 (also of rank two) are connected. Each of these junction boxes 831, 832 transmits first and second query signals E31 and E32, and receives first and second response signals R31 and R32.

As can be seen, the first and second junction boxes of said branch B1N6 of the loop B1 are viewed by the loops B2, B3 in a similar way to the query ports 81, 82 of the central unit 8.

The branch B1N6 is therefore designed to receive, via its junction box 831, the response signals R31 sent by the communication conductors of the loop B3 in response to the query signals E31, and to pass them on in the primary loop B1 in the form of response signals R1 via the communication conductors of the loop B1. The response signals R31 are transmitted to the query port 81 of the central unit that transmitted the query signals.

The branch B1N6 is also designed to receive, via its junction box 822, the response signals R32 sent by the linear sensors of the loop B3 in response to the query signals E32 via the communication conductors of the loop B3, and to pass them on in the primary loop B1 in the form of response signals R1 via the communication conductors of the loop B1. The response signals R32 are transmitted to the query port 82 of the central unit that transmitted the query signals.

This means that numerous topologies can be created, combining loops of different ranks, in a highly flexible way, both in terms of the areas to be monitored and in terms of installation modifications during its lifetime. These advantages are achieved while benefiting from the redundancy and fault localization afforded by the individual operation of each loop, all of whose information is ultimately fed back to the central unit 8 via the two-way communication conductors of each linear sensor.

FIG. 4 shows another example of the invention, in which a set of sensors 5001 to 5006 (here six by way of example, but this number is not limited) are connected together in series, to form a loop, here called a single loop, which is connected by its two ends 4301 and 4406 to the central unit 8. This loop corresponds to a level one loop. This loop also forms a differential query bus.

This loop uses, for example, linear sensors such as the one shown in FIG. 1, without this being in any way limiting with respect to the types of linear sensors that can be used.

The central unit 8 carries a first query or communication port 81 and a second query or communication port 82. The first linear sensor 5001 of the differential query bus is connected to the first query port 81 via its proximal connector 4301. The last linear sensor 5006 is connected by its distal connector 4406 to the second query port 82. Each linear sensor making up the differential query bus comprises two communication conductors. Communication on both communication conductors is two-way. The communication conductors shown here operate in the same way as those shown in FIG. 2 or FIG. 3.

The first query port 81 of the central unit 8 queries all the linear sensors in the loop B1 by transmitting a first query signal E1 through each communication conductor of each linear sensor. It receives a first series of response signals R1 sent back by all the linear sensors, in response to this first query signal E1 via each communication conductor of each linear sensor. Once all the response signals have been received by the query port 81, the second query port 82 of the central unit 8 also queries all the sensors in the loop B1, transmitting a second query signal E2 via each communication conductor of each linear sensor. It receives a second series of response signals R2 sent back by all the linear sensors of the loop B1, in response to this query signal E2 via each communication conductor of each linear sensor.

The query signals E1, E2 and response signals R1, R2 are transmitted by each communication conductor of each linear sensor in the loop B1 independently of one another, but preferably simultaneously. Each sensor's communication conductor is traversed by two queries/responses: on the one hand E1-R1, and on the other E2-R2, so there is two-way communication.

The central unit 8 then compares the response signals from both ends. If no break or fault is present on the differential query bus, the central unit finds no difference when comparing response signals.

In the event of a break 900 or a failure on one of the linear sensors (here 5002) of the differential query bus, the linear sensor in question 5002 is able to respond either upstream or downstream, its management module remaining supplied by the upstream or downstream side of the loop (case of a single break). The first query port 81 therefore receives a response signal from upstream linear sensors, in this case the response signal from the linear sensor 5001 and, if the linear sensor 5002 is supplied from upstream in the direction of query E1, the response signal from the linear sensor 5002. The subsequent ones do not receive the first query signal E1, and cannot respond to it. Once all the response signals have been received by the query port 81 via the communication conductors of each linear sensor, the second query port 82 queries the linear sensors of the differential query bus from the other end of the loop B1 via the communication conductors of each linear sensor, and receives the response signals from the linear sensors which are upstream of the break/failure 900 with respect to the direction of the query signal E2. It therefore receives response signals from all the other linear sensors 5006, 5005, 5004 and 5003 in the same loop B1. And if the linear sensor 5002 is supplied from upstream in the query direction E2, the response signal from the linear sensor 5002. The power bus is configured so that each module 4301 to 4306 is supplied from both upstream and downstream.

In this way, the central unit 8, which queries the differential query bus it sees downstream, receives response signals from all the linear sensors still in operation via the two communication conductors.

Additionally, the dual query bus E1-R1 (solid arrows) and E2-R2 (hollow arrows) comprising the two communication conductors of each sensor is organized so that the central unit 8 can identify the linear sensor at the origin of each response. For example, whatever the query signal E1 or E2 that the central unit receives, the communication modules of the linear sensors 5001 to 5006 are arranged to transmit their response signals with at least one identification datum, which enables the central unit 8 to identify the sensor at the origin of each response.

In the event of a break or failure, for example deduced by the central unit 8 from the fact that it is not receiving enough response signals or that it is receiving only one from each linear sensor instead of two via the communication conductors, the central unit 8 will identify which response signals are arriving via each of its query ports 81 and 82. In the example of break 900 in FIG. 4, the first query port 81 receives the response signal from the first linear sensor 5001, and if the linear sensor 5002 is powered from upstream in the query direction E1, the response signal from the linear sensor 5002. The second query port 82 receives the response signals from the linear sensors 5003 to 5006 and, if the linear sensor 5002 is powered from upstream in the query direction E2, the response signal from the linear sensor 5002. The central unit 8 compares the response signals received by each query port of the central unit and deduces that the faulty linear sensor is the linear sensor located between the last linear sensor of the first bus E1-R1 and the last linear sensor of the second bus E2-R2, and is therefore the linear sensor 5002. In the event of a break, the central unit 8 determines which part of the loop B1 is not responding on the same principle.

In this case, it is important to understand that if the power to a linear sensor is interrupted due to a fault or failure, communication on the differential bus is interrupted. In other words, the two-way communication of the communication conductors "stops" at the point of failure or break. One of the advantages of the invention is that two-way communication is applied at each end of the differential bus, enabling the location of the fault or break to be defined.

Typically, each means of the device according to the invention previously disclosed comprises at least one computer, a central processing or computing unit, an analog electronic circuit (preferably), a digital electronic circuit (preferably), and/or a microprocessor (preferably), and/or software means.

Of course, the invention is not limited to the examples just described, and many adjustments can be made to these examples without going beyond the scope of the invention.

Of course, the various features, forms, variants and embodiments of the invention may be combined with each other in various combinations as long as they are not incompatible or exclusive of each other. In particular, all the variants and embodiments described above can be combined with each other.

The invention claimed is:

1. A method for coding communication conductors of a linear sensor belonging to a system, the system comprising a central unit and a plurality of linear sensors each comprising a first end and a second end and which are connected to one another in series to form a differential bus, which is functionally connected to said central unit by at least one end of said differential bus, each linear sensor comprising at least:
a first connector at a first end of said linear sensor, the first connector comprising a management module connected to a communication module,
a second connector at a second end of said linear sensor;
two communication conductors, the two communication conductors being connected to the first connector at a first end of said two communication conductors, and to the second connector at a second end of said two communication conductors;
the method comprising the following steps:
coding at least two information signals simultaneously as follows:
at least one information signal being coded by the central unit by increasing voltage on the first communication conductor;
at least one information signal being coded by the central unit by decreasing voltage on the second communication conductor;
the central unit reading a voltage by measuring the voltage difference between the two communication conductors;
and in that the system also comprises at least one accessory allowing a modular system to be created.

2. The method according to claim 1, characterized in that the at least one accessory corresponds to a branch, the at least one accessory comprising at least one output.

3. The method according to claim 2, characterized in that the central unit is arranged to send at least one general request to the differential bus and to receive at least one response to said general request from the plurality of linear sensors and the at least one accessory, the method also comprising the following steps:
communicating the at least one general request (RG) sent by the central unit through the plurality of linear sensors and/or the at least one accessory via the two communication conductors; and
communicating the at least one response to the general request (RRG) sent by said plurality of linear sensors and/or by the at least one accessory via the two communication conductors.

4. The method according to claim 2, characterized in that each linear sensor and/or accessory is arranged to send at least one local request and to receive at least one response to the at least one local request from each linear sensor and/or accessory, the method further comprising the following steps:
communicating, via the two communication conductors, the at least one local request (RL) to at least one linear sensor identified by said linear sensor and/or by the at least one accessory, the at least one linear sensor being considered as identified if one of its connectors is connected to one of the connectors of said linear sensor and/or to the at least one output of the at least one accessory; and
communicating, via the two communication conductors, at least one response to at least one local request (RRL) from the linear sensor identified by said linear sensor and/or accessory.

5. The method according to claim 4, characterized in that the at least one response to the local request (RRL) is composed of a unique identifier of the at least one linear sensor identified by said linear sensor and/or the accessory.

6. The method according to claim 4, characterized in that the at least one response to the local request (RRL) and the at least one response to the general request (RRG) also comprise data specific to each linear sensor and/or accessory.

7. The method according to claim 2, characterized in that each linear sensor and/or accessory is characterized by a unique identifier.

8. The method according to claim 7, characterized in that the at least one response to the at least one general request sent by the linear sensor comprises the unique identifier of the at least one linear sensor identified by said linear sensor as well as the unique identifier of said linear sensor, and/or the at least one response to the at least one general request sent by the accessory comprises the unique identifier of the at least one linear sensor identified by said accessory as well as the unique identifier of said accessory.

9. The system for implementing the method according to claim 2, the system comprising the central unit and the plurality of linear sensors each comprising the first end and the second end and which are connected to one another to form a sensing line, which is connected to said central unit by at least one end of said sensing line, the system also comprising the at least one accessory.

10. The method according to claim 1, characterized in that the at least one accessory corresponds to a terminator.

11. The method according to claim 1, characterized in that the at least one accessory corresponds to a neutral cable.

12. The method according to claim 1, characterized in that the information signal is sent by the central unit in a form of information bits.

13. The method according to claim 1, characterized in that communication on the communication conductors is two-way.

\* \* \* \* \*